(12) United States Patent
Chan et al.

(10) Patent No.: US 8,278,891 B2
(45) Date of Patent: Oct. 2, 2012

(54) FEEDBACK VOLTAGE STABILIZING APPARATUS, METHOD, AND POWER CONVERSION SYSTEM

(75) Inventors: Chun-Kong Chan, Hsin Chuang (TW); Po-Yuan Yu, Hsin Chuang (TW)

(73) Assignee: Lien Chang Electronic Enterprise Co., Ltd., Taipei County (TW)

( * ) Notice: Subject to any disclaimer, the term of this patent is extended or adjusted under 35 U.S.C. 154(b) by 380 days.

(21) Appl. No.: 12/752,764

(22) Filed: Apr. 1, 2010

(65) Prior Publication Data
US 2011/0241638 A1    Oct. 6, 2011

(51) Int. Cl.
*G05F 1/575* (2006.01)
*H02J 1/02* (2006.01)
(52) U.S. Cl. ............. 323/271; 323/299; 363/39
(58) Field of Classification Search ........ 363/39, 363/50; 323/265, 268, 271, 299, 349, 350, 323/351; 361/18, 86; 307/113, 130, 132 M, 307/141.8
See application file for complete search history.

(56) References Cited

U.S. PATENT DOCUMENTS

| | | | |
|---|---|---|---|
| 6,072,710 A * | 6/2000 | Chang | 363/132 |
| 6,856,495 B2 * | 2/2005 | Ely | 361/18 |
| 7,535,735 B2 * | 5/2009 | Cuadra et al. | 363/21.15 |
| 2007/0115022 A1 * | 5/2007 | Hemminger et al. | 324/771 |
| 2011/0248694 A1 * | 10/2011 | Chan et al. | 323/282 |

* cited by examiner

*Primary Examiner* — Gary L Laxton
(74) *Attorney, Agent, or Firm* — Muncy, Geissler, Olds & Lowe, PLLC

(57) ABSTRACT

Feedback voltage stabilizing apparatus, method, and power conversion system are disclosed. The apparatus includes a first switching unit, a second switching unit, and a conduction control unit. In which, the first switching unit is coupled to a feedback circuit for controlling whether a feedback signal is transmitted from a first end to a second end. The second switching unit is for avoiding voltage vibrations which caused by the feedback signal occurring at the second end. By capturing a detection signal, the conduction control unit can determine whether to simultaneously turn on the first switching unit and the second switching unit, in order to eliminate the voltage vibrations, or not.

13 Claims, 3 Drawing Sheets

FEEDBACK VOLTAGE STABILIZING APPARATUS, METHOD, AND POWER CONVERSION SYSTEM

BACKGROUND OF THE INVENTION

1. Field of the Invention

The present invention related to a voltage stabilizing apparatus, especially to a feedback voltage stabilizing apparatus, method, and power conversion system.

2. Description of the Related Art

Generally, a power converter usually has a feedback circuit which is for transmitting a feedback signal to primary circuits, in order to control at least a switching unit or other functional modules. However, when the feedback signal is transmitted to the primary circuits, the voltage of the primary circuit may vibrate, and this may cause wrong controlling result and circuit damages.

Moreover, the feedback signal may be an output voltage of the power converter, which is varying according to loads. This kind of feedback signal may cause the primary circuit unexpected voltage and current changes, and cause circuit damages consequently.

SUMMARY OF THE INVENTION

The present invention provides a feedback voltage stabilizing apparatus to the feedback circuit, for eliminating the voltage vibrations at the primary circuit, in order to improve the stability of power conversion circuits.

For achieving the aforementioned purposes, the present invention provides a feedback voltage stabilizing apparatus, associating with a feedback circuit which has a first end and a second end. The feedback voltage stabilizing apparatus includes a first switching unit, a second switching unit, and a conduction control unit. In which, the first switching unit is coupled to the feedback circuit, for controlling whether to transmit a feedback signal from the first end to the second end.

The second switching unit is coupled to the feedback circuit, for eliminating the voltage vibration caused by the feedback signal at the second end. The conduction control unit is coupled to the feedback circuit, the first switching unit, and the second switching unit, for capturing a detection signal from the feedback circuit, and for turning on the first switching unit and the second switching unit at the same time according to the detection signal. So that the voltage which is transmitted back to the second end would be divided into relatively low value, in order to reduce the voltage impact at the second end.

According to another scheme of the present invention which provides a power conversion system. The system includes a power conversion unit and a feedback voltage stabilizing apparatus. In which the power conversion unit has a feedback circuit for transmitting a feedback signal from a first end to a second end. The feedback voltage stabilizing apparatus is coupled to the feedback circuit for eliminating the voltage vibration at the second end.

The feedback voltage stabilizing apparatus has a first switching unit, a second switching unit, and a conduction control unit. The conduction control unit captures a detection signal from the feedback circuit, and simultaneously turns on the first switching unit and the second switching unit according to the detection signal, in order to stabilizing the voltage value of the second end.

The present invention further provides a feedback voltage stabilizing method associated to a feedback circuit which has a first end and a second end. The method includes: providing a first switching unit and a second switching unit to the feedback circuit; capturing a detection signal from the feedback circuit; and controlling the first switching unit and the second switching unit according to the detection signal, in order to eliminating a voltage vibration at the second end.

By providing a feedback voltage stabilizing apparatus to the feedback circuit for simultaneously turning on the first switching unit and second switching unit according to a detection signal, the voltage vibration caused by the feedback signal can be eliminated. Therefore, the stability of the power conversion circuit can also be improved.

For further understanding of the invention, references are made to the following detailed description illustrating the embodiments and examples of the invention. The description is only for illustrating the invention, not for limiting the scope of the claim.

BRIEF DESCRIPTION OF THE DRAWINGS

The drawings included herein provide further understanding of the invention. A brief introduction of the drawings is as follows.

DETAILED DESCRIPTION OF THE PREFERRED EMBODIMENTS

Figure 1:
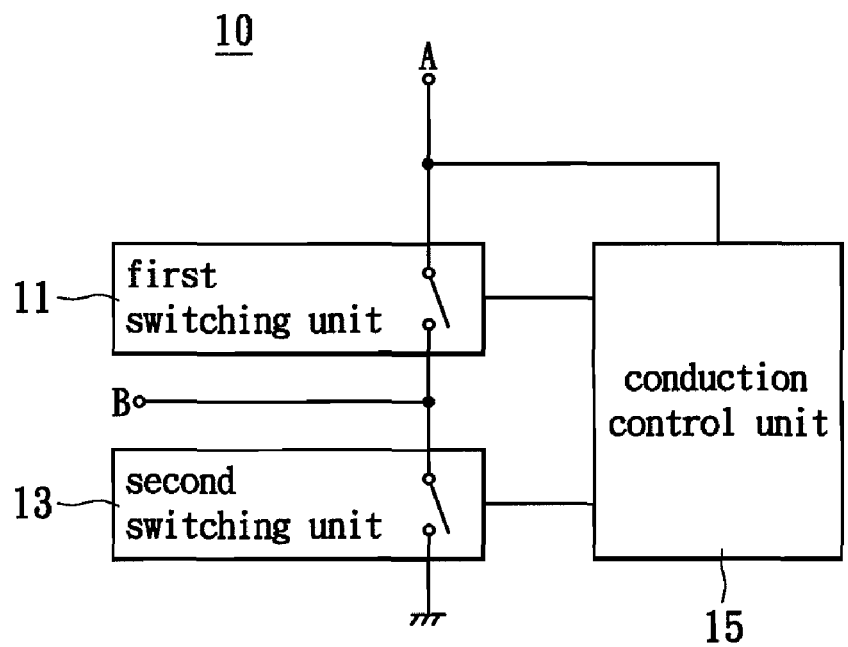
FIG. 1 is a block diagram of a feedback voltage stabilizing apparatus according to one embodiment of the present invention.

Please refer to FIG. 1, which is a block diagram of a feedback voltage stabilizing apparatus 10 according to one embodiment of the present invention. The apparatus 10 includes a first switching unit 11, a second switching unit 13, and a conduction control unit 15. In which the first switching unit 11 is for controlling whether to transmit a feedback signal from point A to point B or not.

The point A does not always need to transmit the feedback signal to the point B, so the first switching unit 11 should be turned on or off by the conduction control unit 15 according to the status of the feedback signal. The conduction control unit 15 captures a detection signal from point A, such as a feedback voltage of the feedback signal, for determining whether the feedback signal needs to be transmitted from point A to point B. And then, the conduction control unit 15 would turn on or off the first switching unit 11 according to the determination result.

In which, the conduction control unit 15 compares the feedback voltage with a reference value, for determining whether the feedback signal needs to be transmitted from point A to point B, in order to avoid false feedback actions. In this embodiment, if the feedback voltage is larger than the reference value, the conduction control unit 15 then turns on the first switching unit 11 for transmitting the feedback signal.

At the moment when the first switching unit 11 turns on, the voltage at point B may vibrate substantially because of receiving the feedback signal. And this may cause circuit damages. Therefore, the conduction control unit 15 would simultaneously turns on the second switching unit 13 at the moment when the first switching unit 11 turns on, in order to divide the voltage of feedback signal into relatively lower value according to a feedback ratio which is determined by the internal resistance of the first switching unit 11 and the second switching unit 13. This can reduce the voltage vibration caused by the feedback signal, and further stabilize the voltage value at point B.

Figure 2:
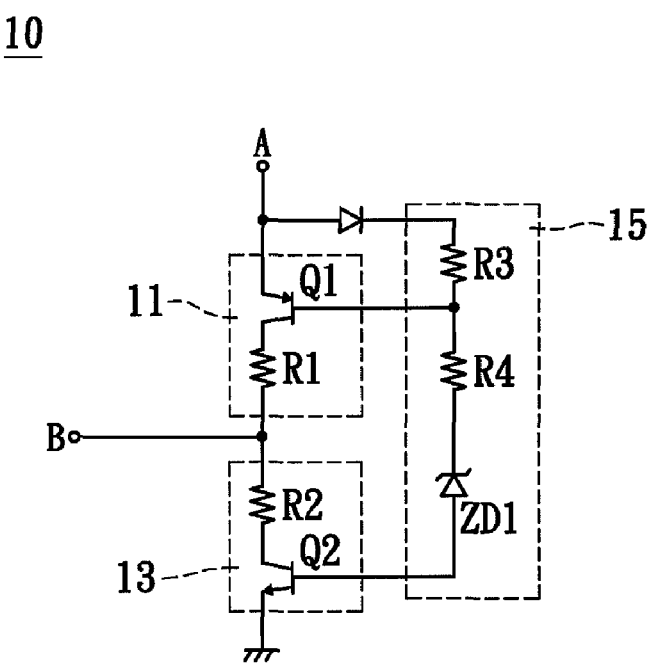
FIG. 2 is a circuit diagram of a feedback voltage stabilizing apparatus according to one embodiment of the present invention.

Please refer to FIG. 2, which is a schematic circuit diagram of a feedback voltage stabilizing apparatus 10 according to one embodiment of the present invention. The apparatus 10 has a first switching unit 11, a second switching unit 13, and a conduction control unit 15. In which, the conduction control unit has resistors R3, R4, and a zener diode ZD1.

In this embodiment, the conduction control unit 15 captures the detection signal, which is the value of feedback voltage, from point A. When the feedback voltage is lower than the breakdown voltage (that is, the reference value) of the zener diode ZD1 (this indicates that at the moment the feedback signal does not need to be transmitted to point B), the circuit which associated with the resistor R4 and the zener diode ZD1 is not conductible, so there is no current flowing into the conduction control unit 15.

Therefore, there is no voltage difference between base node and emitter node of the PNP transistor Q1 in the first switching unit 11, and there is also no driving voltage sent to the base node of the NPN transistor Q2 in the second switching unit 13. Thus, the first switching unit 11 and the second switching unit 13 are turned off.

On the other hand, when the feedback voltage is larger than the breakdown voltage of the zener diode ZD1 (this indicates that at the moment the feedback signal needs to be transmitted to point B), the circuit associated with the zener diode ZD1 is conductible. And, the reverse biased voltage across the zener diode ZD1 is fixed at the value of the breakdown voltage according to the characteristics of the zener diode ZD1.

Thus, there is a current flowing into the conduction control unit 15, and the current causes voltage difference across the resistor R3. And, the PNP transistor Q1 is then turned on due to the voltage difference between the base node and the emitter node, so as to transmit the feedback signal from point A to point B. At the same time, the NPN transistor Q2 is turned on because a driving voltage is sent to the base node of the NPN transistor Q2. By turning on the second switching unit 13 at the same time when the first switching unit 11 is turned on, the feedback signal is then divided into lower value and transmitted to point B according to a feedback ratio. In which the feedback ratio is determined by the resistance of the resistor R1 and R2.

According to the operation of the conduction control unit 15, the voltage vibration at the point B can be reduced, and this avoids circuit damages caused by the feedback signal, further increasing the stability of the whole circuit.

Figure 3:
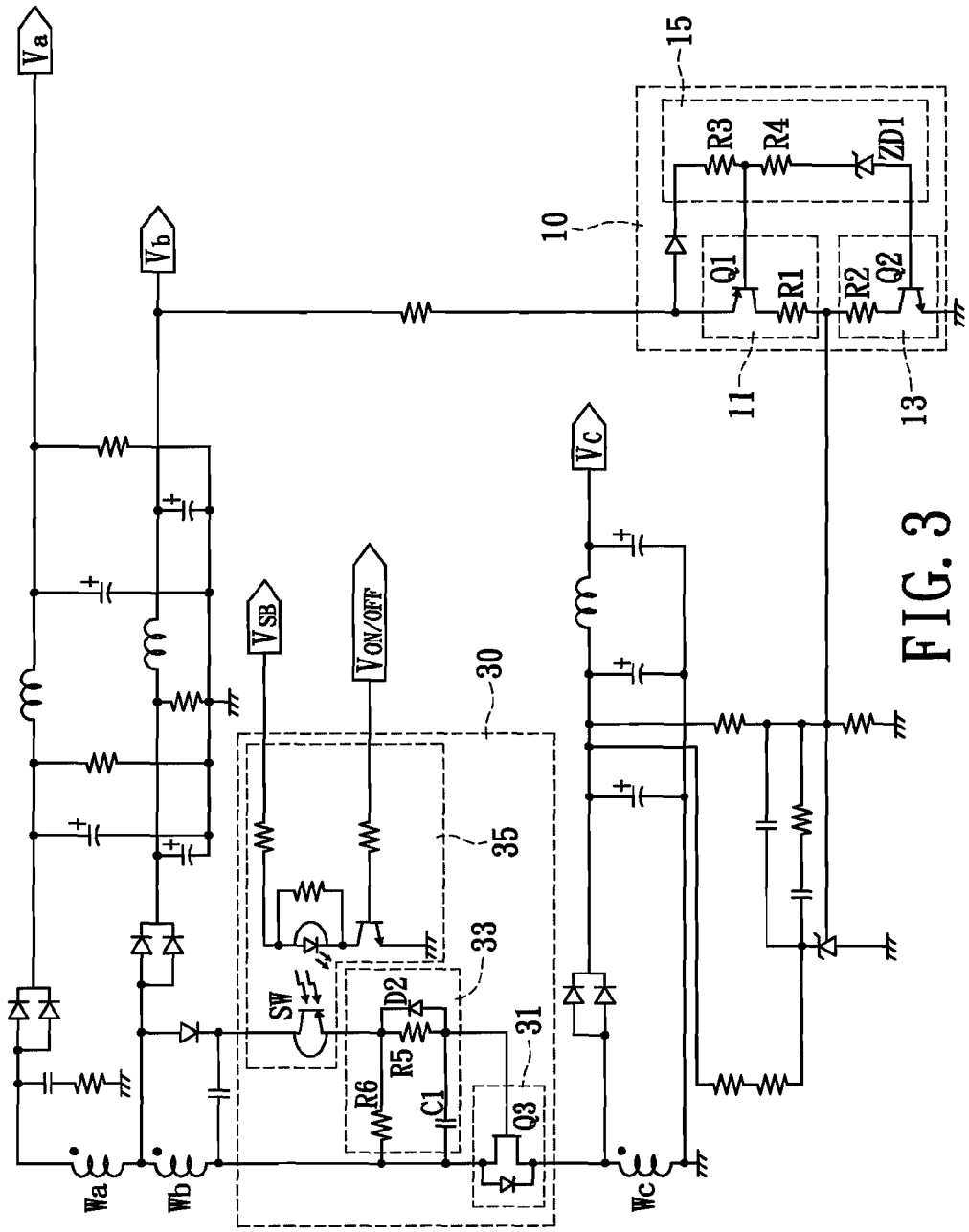
FIG. 3 is a circuit diagram of a power conversion system according to one embodiment of the present invention.

Please refer to FIG. 3, which is a circuit diagram of a power conversion system 20 according to an embodiment of the present invention. The system 20 includes a plurality of secondary coils Wa, Wb and Wc, which are for generating output voltages Va, Vb, and Vc respectively. In which, the output voltage Va and Vb can be controlled by the switching apparatus 30 whether to be generated or not. And additionally, a feedback circuit is set to transmit the output voltage Vb to the circuit of the output voltage Vc.

The switching apparatus 30 includes a main switching unit 31, a buffer unit 33, and an auxiliary switching unit 35. When the transistor Q3 of the main switching unit 31 is turned on, the output voltage Va and Vb have high voltage level. In this embodiment, the high voltage level indicates that the output voltage Va and Vb operate normally, thus the output voltage Vb needs to be transmitted back to the circuit of output voltage Va for further controlling. On the other hand, when the transistor Q3 turns off, the output voltage Va and Vb are not in use, so the feedback operation needs not be executed.

As discussed above, the scheme to determine whether the output voltage Va and Vb is operating or not in this embodiment is to detect the voltage value of the output voltage Vb, thus, the detection signal which is captured by the feedback voltage stabilizing apparatus 10 is the voltage value of the output voltage Vb. After capturing the detection signal, the voltage value of the output voltage Vb would be compared with the breakdown voltage of the zener diode ZD1 in the conduction control unit 15 of the feedback voltage stabilizing apparatus 10, in order to determine whether the output voltage is operating or not.

Therefore, a zener diode having a breakdown voltage which is lower than the voltage value of normally-operating output voltage Vb may be chosen as zener diode ZD1. So when the output voltage Vb is operating normally, the zener diode ZD1 is reversely biased (thus conductible). And when the output voltage Vb is not operating, the circuit associating with the zener diode ZD1 is turned off.

When the zener diode ZD1 is turned off (this indicated that the output voltage Vb is not operating), there is no current flowing into the conduction control unit 15. So there is no voltage difference between the base node and the emitter node of the transistor Q1, and the transistor Q2 does not receive driving voltage to turn it on. Consequently, the output voltage Vb would not be transmitted back to the circuit of the output voltage Vc.

On the other side, when the output voltage Vb is operating normally, the zener diode ZD1 would be reversely biased, so the circuit associated with the zener diode ZD1 and the resistor R4 is conductible. Thus, a current is flowing into the conduction control unit 15 and causes voltage difference across the resistor R3, and the voltage difference across the resistor R3 turns on the transistor Q1. Simultaneously, a driving voltage is sent to the base node of the transistor Q2 due to the reversely biased zener diode ZD1, so the transistor Q2 is also turned on.

As discussed above, because the transistor Q1 and Q2 turns on at the same time, the feedback signal (output voltage Vb) is divided into relatively lower value according to a feedback ratio, which is determined by the resistance of resistor R1 and R2. Therefore, the chance of voltage vibration at output voltage Vc caused by the feedback signal can be reduced, and the stability of the whole circuit can be increased.

Additionally, the switching apparatus 30 which is for controlling the output voltage Va and Vb can have soft switching mechanism in order to increase the circuit stability.

Please refer to FIG. 3 again. The photo coupler SW has two inputs which are voltage $V_{SB}$ and voltage $V_{ON/OFF}$ respectively. The photo coupler SW is conductible only when the voltage $V_{SB}$ and $V_{ON/OFF}$ both input high voltage level.

After the photo coupler SW turns on, a high voltage driving voltage is then transmitted through the photo coupler SW. And at the moment when the photo coupler SW turns on, a great portion of the driving voltage is used to charge a capacitor C1 of the buffer unit 33. So a modulated driving voltage with relatively low voltage value is transmitted to the transistor Q3 of the main switching unit 31. This cause the transistor Q3 has relatively higher internal resistance at the beginning when it is turned on by the modulated driving voltage. Thus, the current and voltage across the transistor Q3 are relatively low.

With the time passing, the capacitor C1 would be fully charged, so the voltage value of the modulated driving voltage increases and the induced internal resistance of the transistor Q3 decreases gradually. Therefore, the voltage and current across the transistor Q3 would finally reach the normal values, so as to provide soft start mechanism to the power conversion system 20.

On the other hand, when the photo coupler SW turns off, the driving voltage is at low voltage level. At the moment, the capacitor C1 is fully charged, so the voltage of the capacitor C1 is used as the modulated driving voltage which drives the transistor Q3. With the time passing, the energy stored in the capacitor C1 is gradually consumed by the resistor R6, so the voltage value of the modulated driving voltage would decrease gradually. This makes the induced internal resistance of the transistor Q3 increasing. The transistor Q3 turns off only when the voltage value of the modulated driving voltage is not enough to turn it on. Therefore, the soft switching mechanism is performed in order to increase the stability of the whole circuit.

Figure 4:
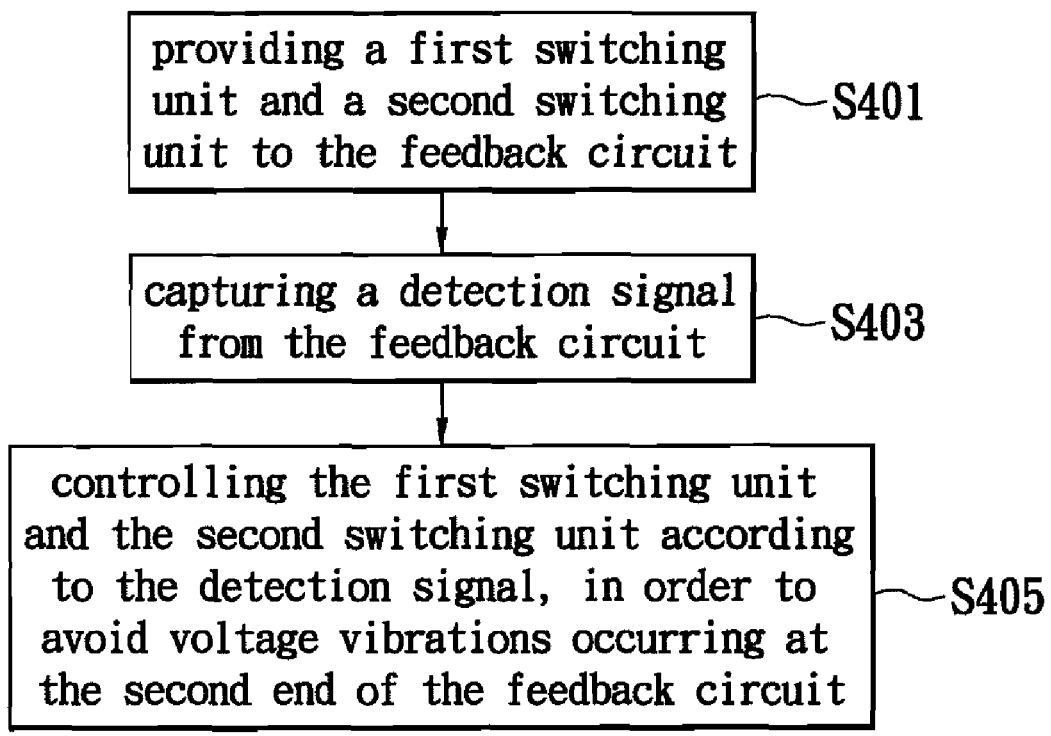
FIG. 4 is a flow chart of a feedback voltage stabilizing method according to one embodiment of the present invention.

Please refer to FIG. 4, which is a flow chart of a feedback voltage stabilizing method according to an embodiment of the present invention. The method is associated with a feedback circuit which has a first end and a second end. The method includes: providing and a first switching unit 11 and a second switching unit 13 to the feedback circuit (S401). In which the first switching unit 11 has a first resistor R1 and the second switching unit 13 has a second resistor R2. Then the conduction control unit 15 captures a detection signal from the feedback circuit (S403). After that, the conduction control unit 15 controls the first switching unit 11 and the second switching unit 13 for avoiding a voltage vibration, which is cause by the feedback circuit, occurring at the second end (S405).

In this embodiment, the detection signal captured by the conduction control unit 15 may be a feedback voltage of the feedback signal. The conduction control unit 15 would compare the feedback voltage with a reference value (the breakdown voltage of the zener diode ZD1 in this embodiment). If the feedback voltage is larger than the reference value, the conduction control unit 15 then turns on the first switching unit 11 and the second switching unit 13 at the same time, for dividing the feedback voltage into relatively low value, so as to avoiding voltage vibrations occurring at the second end.

Therefore, by providing feedback voltage stabilizing mechanism to the feedback circuit, the voltage vibration can be eliminated, and furthery improve circuit stability.

Some modifications of these examples, as well as other possibilities will, on reading or having read this description, or having comprehended these examples, will occur to those skilled in the art. Such modifications and variations are comprehended within this invention as described here and claimed below. The description above illustrates only a relative few specific embodiments and examples of the invention. The invention, indeed, does include various modifications and variations made to the structures and operations described herein, which still fall within the scope of the invention as defined in the following claims.

What is claimed is:

1. A feedback voltage stabilizing apparatus associating with a feedback circuit which has a first end and a second end, comprising:
   a first switching unit coupled to the feedback circuit, for controlling whether a feedback signal is transmitted from the first end to the second end;
   a second switching unit coupled to the feedback circuit; and
   a conduction control unit coupled to the feedback circuit, the first switching unit, and the second switching unit, for capturing a detection signal from the feedback circuit, and for simultaneously turning on the first switching unit and the second switching unit according to the detection unit, in order to avoid a voltage vibration occurring at the second end.

2. The feedback voltage stabilizing apparatus as in claim 1, wherein the first switching unit has a first resistor, and the second switching unit has a second resistor, in which the first resistor and second resistor are for dividing a voltage of the feedback signal according to a feedback ratio.

3. The feedback voltage stabilizing apparatus as in claim 1, wherein the detection signal is a feedback voltage at the first end of the feedback circuit.

4. The feedback voltage stabilizing apparatus as in claim 3, wherein the conduction control unit determines whether the feedback voltage is larger than a reference value or not, if the feedback voltage is larger than the reference value, the conduction control unit then simultaneously turns on the first switching unit and the second switching unit.

5. The feedback voltage stabilizing apparatus as in claim 1, wherein the conduction control unit includes a zener diode.

6. A power conversion system, comprising:
   a power conversion unit having a feedback circuit, which includes a first end and a second end;
   a feedback voltage stabilizing apparatus coupled to the power conversion unit, for avoiding a voltage vibration occurring at the second end, in which the feedback voltage stabilizing apparatus includes:
      a first switching unit coupled to the feedback circuit, for controlling whether a feedback signal is transmitted from the first end to the second end;
      a second switching unit coupled to the feedback circuit; and
      a conduction control unit coupled to the feedback circuit, the first switching unit, and the second switching unit, for capturing a detection signal from the feedback circuit, and for simultaneously turning on the first switching unit and the second switching unit according to the detection unit.

7. The power conversion system as in claim 6, wherein the first switching unit has a first resistor, and the second switching unit has a second resistor, in which the first resistor and second resistor are for dividing a voltage of the feedback signal according to a feedback ratio.

8. The power conversion system as in claim 6, wherein the detection signal is a feedback voltage at the first end of the feedback circuit.

9. The power conversion system as in claim 8, wherein the conduction control unit determines whether the feedback voltage is larger than a reference value or not, if the feedback voltage is larger than the reference value, the conduction control unit then simultaneously turns on the first switching unit and the second switching unit.

10. The power conversion system as in claim 6, wherein the conduction control unit includes a zener diode.

11. A feedback voltage stabilizing method associating with a feedback circuit which is for transmitting a feedback signal from a first end to a second end, comprising:
   providing a first switching unit and a second switching unit to the feedback circuit;
   capturing a detection signal from the feedback circuit; and
   controlling the first switching unit and the second switching unit according to the detection signal, in order to avoid a voltage vibration occurring at the second end.

12. The feedback voltage stabilizing method as in claim 11, wherein the detection signal is a feedback voltage at the first end of the feedback circuit.

13. The feedback voltage stabilizing method as in claim 12, wherein the step of controlling the first switching unit and the second switching unit according to the detection signal includes determining whether the feedback voltage is larger than a reference value, if the feedback voltage is larger than the reference value, then simultaneously turning on the first switching unit and the second switching unit.

* * * * *